United States Patent Office 3,424,264
Patented Jan. 28, 1969

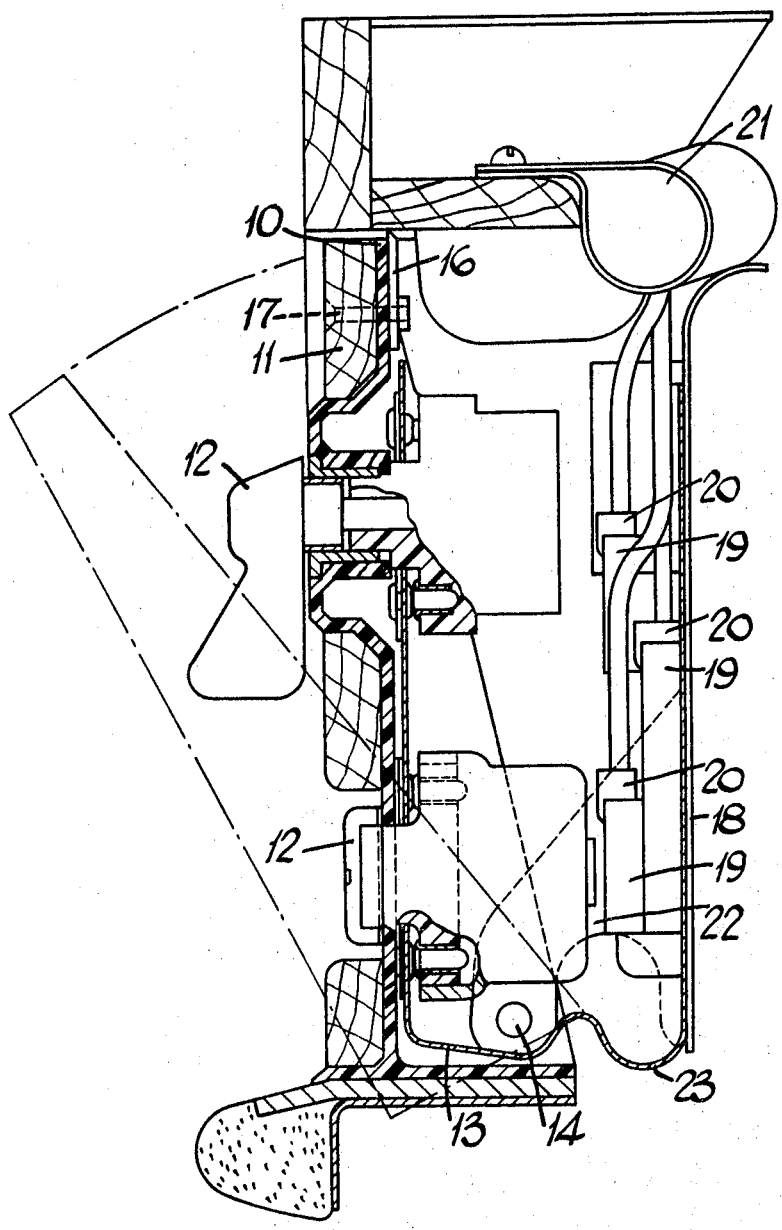

3,424,264
DASHBOARD ASSEMBLIES FOR ROAD VEHICLES
Nigel Neville William Long, Ward End, Birmingham, and Raymond Hickton, Halesowen, England, assignors to Joseph Lucas (Industries) Limited, Birmingham, England, a British company
Filed Apr. 11, 1967, Ser. No. 630,073
Claims priority, application Great Britain, Apr. 21, 1966, 17,458/66
U.S. Cl. 180—90      3 Claims
Int. Cl. B60k 37/00; H02b 1/00, 9/00

ABSTRACT OF THE DISCLOSURE

A dashboard assembly for a road vehicle including a movable front panel carrying instruments and switches, pivotally engaged with a fixed back panel carrying sockets for engagement by plugs on the wiring harness of the vehicle and a flexible printed circuit member electrically connecting the sockets with the instruments and switches.

---

This invention has for its object to provide a dashboard assembly for a road vehicle in a convenient form.

In accordance with the present invention a dashboard assembly comprises the combination of a movable front panel carrying a plurality of electrical components which in use are visible to the driver of the vehicle, a relatively fixed back panel, and a flexible printed circuit making electrical connections between the components and connecting means on the back panel, the flexible printed circuit permitting relative movement between the front and back panels without necessitating disconnection of the electrical circuits, and said connecting means on the back panel being adapted to engage and so complete circuits to and from a wiring harness of the vehicle.

The accompanying drawing is a cross sectional view of a dashboard assembly and illustrates one example of the invention.

Referring to the drawing the dashboard assembly includes a front panel comprising a moulded support plate 10 for a wooden or other decorative trim 11 which constitutes the vehicle facia. The plate 10 carries a plurality of instruments and controls indicated generally at 12, these being accessible for viewing and manipulation from the front of the assembly. The plate 10 includes integral flanges 13 at opposite ends thereof respectively.

The assembly also includes a plate-like back panel 18 carrying on its face adjacent to the front panel connecting means in the form of a plurality of electrical sockets 19 into which fit co-operating plugs 20 which in turn are permanently connected to a wiring harness 21 in the vehicle.

The panel 18 includes flanges 22 which are pivotally interconnected with the flanges 13 at the pivot positions 14, the panel 18 being secured in any convenient manner (not shown) to the vehicle bulkhead 16.

A flexible printed circuit 23 serves to interconnect electrically the instruments and controls 12, and respective sockets 19 through which the instruments and controls are electrically connected to the harness 21.

The flexible printed circuit 23 extends in a loop between the front and back panels so that the front panel can be moved relatively to the back panel without necessitating disconnection of the electrical circuits between the panels. The back panel 18 may if desired also carry other equipment such as a fuse box, and there may be a detachable cover normally enclosing the wiring and plug and socket connectors on the back panel 18, such a cover could be apertured to expose those components on the back panel which occasionally require attention in use such as for example, the fuse box. This detachable cover is however not illustrated in the drawings.

The front panel is, in use, secured in position by screws 17 which pass through the front panel and engage the bulkhead 16 of the vehicle.

Having thus described our invention what we claim as new and desire to secure by Letters Patent is:

1. A dashboard assembly for a road vehicle comprising the combination of a movable front panel carrying a plurality of electrical components which in use are visible to the driver of the vehicle, a relatively fixed back panel, and a flexible printed circuit making electrical connections between the components and connecting means on the back panel, the flexible printed circuit permitting relative movement between the front and back panels without necessitating disconnection of the electrical circuits, and said connecting means on the back panel being adapted to engage and so complete circuits to and from a wiring harness of the vehicle.

2. An assembly as claimed in claim 1 wherein the front panel includes a decorative trim which constitutes the vehicle facia.

3. An assembly as claimed in claim 1 wherein the front panel and the back panel are pivotally interconnected.

References Cited

UNITED STATES PATENTS

| | | | |
|---|---|---|---|
| 2,923,860 | 2/1960 | Miller | 240—8.16 X |
| 3,022,447 | 2/1962 | Henss | 180—90 X |
| 3,137,212 | 6/1964 | Rose | 317—99 X |
| 3,270,831 | 9/1966 | Woofter et al. | 180—90 |

FOREIGN PATENTS

| | | |
|---|---|---|
| 992,083 | 5/1965 | Great Britain. |
| 1,016,711 | 1/1966 | Great Britain. |
| 1,026,887 | 4/1966 | Great Britain. |

KENNETH H. BETTS, *Primary Examiner.*

U.S. Cl. X.R.
317—99, 122